United States Patent [19]

Sandford

[11] Patent Number: 6,045,882

[45] Date of Patent: Apr. 4, 2000

[54] MULTILAYER THIN PLASTIC FILM, USEFUL FOR SHRINK OVERWRAP PACKAGING

[75] Inventor: Craig Lawrence Sandford, Wheeling, Ill.

[73] Assignee: Viskase Corporation, Chicago, Ill.

[21] Appl. No.: 09/116,155

[22] Filed: Jul. 16, 1998

[51] Int. Cl.$^7$ .................................................. B65B 53/00

[52] U.S. Cl. ..................... 428/34.9; 428/213; 428/218; 428/220; 428/516; 264/514; 264/909

[58] Field of Search .................................. 428/220, 34.9, 428/213, 516, 218; 264/500, 510, 514, 909

[56] References Cited

U.S. PATENT DOCUMENTS

| | | | |
|---|---|---|---|
| 3,592,881 | 7/1971 | Ostapchenko | 260/897 |
| 4,229,241 | 10/1980 | Mueller | 156/243 |
| 4,514,465 | 4/1985 | Schoenberg | 428/339 |
| 4,532,189 | 7/1985 | Mueller | 428/516 |
| 4,551,380 | 11/1985 | Schoenberg | 428/218 |
| 4,590,124 | 5/1986 | Schoenberg | 428/339 |
| 4,617,241 | 10/1986 | Mueller | 428/520 |
| 4,643,943 | 2/1987 | Schoenberg | 428/339 |
| 4,760,116 | 7/1988 | Roberts | 525/221 |
| 4,770,912 | 9/1988 | Furrer et al. | 428/35 |
| 4,778,699 | 10/1988 | Knox et al. | 428/35 |
| 4,804,714 | 2/1989 | Olivo | 525/240 |
| 4,816,343 | 3/1989 | Mueller et al. | 428/480 |
| 4,820,471 | 4/1989 | van der Molen | 264/564 |
| 4,820,557 | 4/1989 | Warren | 428/34.9 |
| 4,824,912 | 4/1989 | Su | 525/240 |
| 4,833,017 | 5/1989 | Benoit | 428/323 |
| 4,833,024 | 5/1989 | Mueller | 428/349 |
| 4,837,084 | 6/1989 | Warren | 428/349 |
| 4,851,272 | 7/1989 | Knox et al. | 428/35.2 |
| 4,863,769 | 9/1989 | Lustig et al. | 428/34.9 |
| 4,863,770 | 9/1989 | Knox et al. | 428/35.7 |
| 4,886,690 | 12/1989 | Davis et al. | 428/36.6 |
| 4,927,708 | 5/1990 | Herran et al. | 428/332 |
| 4,956,212 | 9/1990 | Bekele | 428/36.6 |
| 5,023,143 | 6/1991 | Nelson | 428/516 |
| 5,089,321 | 2/1992 | Chum et al. | 428/218 |
| 5,210,142 | 5/1993 | Kale et al. | 525/240 |
| 5,234,731 | 8/1993 | Ferguson | 428/34.9 |
| 5,279,872 | 1/1994 | Ralph | 428/34.9 |
| 5,298,202 | 3/1994 | Schirmer | 264/22 |
| 5,298,326 | 3/1994 | Norpoth et al. | 428/349 |
| 5,314,749 | 5/1994 | Shah | 428/349 |
| 5,419,795 | 5/1995 | Wood | 156/184 |
| 5,456,979 | 10/1995 | Schirmer | 428/336 |
| 5,460,861 | 10/1995 | Vicik et al. | 428/34.9 |
| 5,491,019 | 2/1996 | Kuo | 428/213 |
| 5,589,561 | 12/1996 | Barry et al. | 526/348.1 |
| 5,604,043 | 2/1997 | Ahlgren | 428/518 |
| 5,629,059 | 5/1997 | Desai | 428/34.9 |
| 5,635,262 | 6/1997 | Best et al. | 428/36.92 |
| 5,759,648 | 6/1998 | Idlas | 428/34.9 |
| 5,804,660 | 9/1998 | Whetten | 525/240 |

FOREIGN PATENT DOCUMENTS

| | | |
|---|---|---|
| 595 252 A1 | 5/1994 | European Pat. Off. . |
| WO 93/13143 | 7/1993 | WIPO . |
| WO 95/00333 | 1/1995 | WIPO . |
| WO 95/10566 | 4/1995 | WIPO . |

OTHER PUBLICATIONS

OXY Occidental Chemical Corporation, Alathon Polymers Division, ALATHON® L5045–1 page (1992).

Polytype, Biaxial Orientation lines, 8 page brochure at least as early as 1997.

*Primary Examiner*—William Krynski
*Assistant Examiner*—Hong J. Xu
*Attorney, Agent, or Firm*—Cedric M. Richeson

[57] ABSTRACT

A multilayer, biaxially stretched, flexible, hermoplastic film having at least three (preferably five) layers (a), (b), and (c) with layer (b) disposed between layers (a) and (c), layers (a) and (c) each being a blend of at least 45% of a copolymer of ethylene and at least one $C_3$–$C_{10}$ α-olefin, having a density of 0.900 g/cm$^3$ to <0.915 g/cm$^3$, and a melting point between 85° C. and 125 ° C. with at least 5% of a high density polyethylene, and layer (b) being at least 45% of a copolymer of ethylene and at least one $C_3$–$C_{10}$ α-olefin, having a density of 0.900 g/cm$^3$ to <0.915 g/cm$^3$, and a melting point of 85° C.–125° C., the film being 50.8 micrometers($\mu$) or less in thickness, and having a shrinkage value of at least 60% in at least one direction at 127° C., and a process for making the film.

36 Claims, No Drawings

MULTILAYER THIN PLASTIC FILM, USEFUL FOR SHRINK OVERWRAP PACKAGING

BACKGROUND OF THE INVENTION

The present invention relates to improvements in the art of plastic film shrink overwrap packaging.

Various polymer acronyms are used herein and listed below. A colon (:) will be used to indicate components to the left and right of the colon are blended. A slash "/" will be used to indicate that components to the left and right of the slash are in different layers and the relative position of layers. Acronyms include:

PE-Polyethylene (an ethylene homopolymer and/or copolymer of a major portion of ethylene with one or more α-olefins)

HDPE-High Density Polyethylene, A homopolymer of ethylene or a copolymer of a major portion by weight of ethylene with one or more α-olefins, the homopolymer or copolymer having a density greater than 0.940 g/cm$^3$, and a melting point between 125° C. and 140° C.

LDPE-Low Density Polyethylene, A highly branched homopolymer of ethylene having a density between 0.915 and 0.930 g/cm$^3$, typically having long branches off the main backbone chain with alkyl substituents of 2 to 8 carbon atoms on these branches.

VLDPE-Very Low Density Polyethylene, A copolymer of a major portion by weight of ethylene with one or more α-olefins, the copolymer having a density greater than 0.86 and less than 0.915 g/cm$^3$, a melting point between 85° C. and 125° C., and a Vicat Softening Point (VSP) greater than 60° C.

LLDPE-Linear Low Density Polyethylene, A copolymer of a major portion by weight of ethylene with one or more α-olefins, the copolymer having a density of at least 0.915 g/cm$^3$, a melting point between 115° C. and 130° C., and a Vicat Softening Point (VSP) greater than 60° C.

Various published documents disclose different types of packaging films.

U.S. Pat. No. 4,551,380 (Schoenberg) discloses an oriented, heat sealable, multilayer packaging film having a structure of LLDPE:LMDPE:EVA/LLDPE/LLDPE:LMDPE:EVA, where the film is crosslinked and heat shrinkable. Use of erucamide slip agents and diatomaceous earth antiblock agents are also disclosed.

U.S. Pat. No. 4,760,116 (Roberts) discloses a heat shrinkable film which is crosslinked at an irradiation dosage of from 1 to 5 megarads and is a blend of linear low or medium density polyethylene with a copolymer of ethylene and a vinyl acetate, acrylic acid, or ester, such as EVA. Use of erucamide slip agents and silica antiblock agents is also disclosed.

U.S. Pat. No. 5,707,751 (Garza et al) discloses multilayer shrink films of which at least one layer is a blend of a metallocene catalyzed polyolefin having a density <0.92 g/cm$^3$ and a melting point <115° C. with a polyolefin having a melting point that is at least 10° C. greater than the first mentioned polyolefin. It is further stated that this blend may also be further blended with "one or more additional polymers or copolymers such as other VLDPEs, LDPE, HDPE, LLDPE, polypropylene, propylene copolymers, styrene polymers and copolymers, polyester, nylon, PVDC, EVOH, ethylene-vinylacetate copolymer (EVA) and ionomers."

Various monolayer and multilayer thermoplastic heat shrinkable films have been commercialized for overwrap packaging of e.g. food such as poultry and cheese, industrial products such as tools and building components, and consumer products such as toys, tapes, and reading materials. One to six layer films are common. Typical structures include: LLDPE:EVA and LLDPE:EVA/LLDPE/LLDPE:EVA/LLDPE/LLDPE:EVA. Some are irradiatively crosslinked and/or corona treated or not.

Also known are films suitable for packaging foodstuffs that are heat shrinkable at temperatures from 80° C. to 127° C. and which are heat sealable using well known commercially available sealers.

These films are typically provided to end users for packaging goods as sheets wound on rolls which are often center folded. In a typical packaging operation, the folded film passes over a separator bar with opposing film sides on either side of the bar. The lower film side is passed beneath a support plate on which goods to be packaged are placed. The goods and film are then transferred to a sealing station where an L-bar seal is applied which simultaneously seals and cuts the folded film. The film trim is continuously removed and wound on a reel as each package advances through the sealing operation. A subsequent L-bar seal provides the final leg of a U-shaped seal around the goods and with the fold provides a sealed envelope around the goods. The sealed package is then transferred to a hot air oven or tunnel where the film is heat shrunk around the goods. The seal may be hermetic thereby providing a balloon package for cushioning, but often the film is perforated prior to sealing and/or heat shrinking so that the film shrinks tight around the goods.

Generally heat sealing of thermoplastic film is accomplished by applying sufficient heat and pressure to adjacent film layer surfaces for a sufficient time to cause a fusion bond between the layers.

A common type of seal used in manufacturing overwrapped packaged goods is known to those skilled in the art as an impulse seal. An impulse seal is made by application of heat and pressure using opposing surfaces at least one of which is a heating surface such as a wire, knife, covered wire or ribbon through which electric current is passed for a very brief time period (hence the name "impulse") to generate heat which thereby causes the adjacent film layers to fusion bond. An impulse sealer using a wire may also use the wire to cut through the film layers to provide separate packages. Typically, the surface opposing the heated surface is a resilient, heat resistant pad.

Hot bar seals may also be used. In making a hot bar seal, adjacent thermoplastic layers are held together by opposing bars of which at least one is heated to cause the adjacent thermoplastic layers to fusion bond by application of heat and pressure across the area to be sealed. The impulse seal or hot bar,seal may be used in parallel pairs with a cutting knife located between the seals.

One problem which occurs during the packaging operation is that the film sticks to the separator bar causing the film to jam or back up at that point interfering with production. Another problem is puckering of the film along the sealed edge. Yet another problem is stickiness of the film after packaging as it slides against adjacent similarly packaged goods during packing into a carton. Such stickiness can make it difficult e.g. to package plastic film coated cartons into a box and in particularly packing the last carton into the box may be very difficult unless the film will slide easily against itself. When this sliding occurs immediately after the package comes from the shrinking step which performed at elevated temperatures, sticking is a problem. The ability of the hot film to slide against itself after packaging is known in the art as "hot slip".

Irradiation of a multilayer film causes the various irradiated layers in the film to crosslink. Under controlled conditions, crosslinking by irradiation raises and may also broaden the temperature range for heat sealing.

Disadvantageously, if the heat sealing layer of the thermoplastic film is crosslinked too heavily, the highly crosslinked layer is more difficult to melt or fusion bond which makes it difficult to achieve strong seals, particularly by impulse sealing. All of the seals should maintain their integrity to protect the enclosed products and provide a good appearance.

Some applications require a strong continuous seal to prevent unwanted egress and ingress of gaseous, liquid or solid materials between the bag exterior and interior. This is particularly necessary for food-containing packages.

There is a continuing need for multilayer films which can be used to package a variety of goods providing strong seals especially when formed by impulse sealing and having good slip characteristics and good optical properties. Such films should be able to produce such seals over a wide sealing temperature range in a film having a combination of good optical properties, tear resistance, high shrinkage values, and good slip characteristics.

Variations in sealing temperatures, times and pressure are known to exist not only from one brand and/or type of sealers to another but also between different sealing machines sold by the same manufacturer under the same brand identification. Such variations, which may be due to factors such as variation in the manufacturer's product or varying equipment settings or installation, increase the desirability for films which may be heat sealed to produce strong integral seals over a wide range of temperatures and therefore be usefully sealed on different sealing machines.

Another problem encountered during heat sealing is that of inadvertent folding. Normally, a heat seal is made by applying heat and pressure across two sheets or portions of film e.g. the two opposing sides of a flattened tube, however, occasionally the area to be sealed will be inadvertently folded to produce a section of film having four or six sheets or film portions which are pressed between the opposing sealer bars. A wider impulse heat sealing temperature range is indicative of a greater latitude in sealing through folds than a narrower range.

SUMMARY OF THE INVENTION

It is an object of the invention to provide a multilayer thin film having high tear strength.

It is another object of the invention to provide a multilayer thin film having excellent hot slip properties.

It is another object of the invention to provide a multilayer thin film having a low coefficient of friction.

It is another object of the invention to provide a multilayer thin film having high gloss and low haze values.

It is another object of the invention to provide a heat sealable film capable of forming high strength fusion bonds.

It is another object of the invention to provide a multilayer thin film containing HDPE and which has high shrinkage values at 127° C. or less.

It is a further object of the invention to provide an irradiatively crosslinked, multilayer thin film having a broad impulse heat sealing voltage range.

It is yet another object of the invention to provide a transparent multilayer thin film having good optical properties.

It is still another object of the invention to provide a thin film having low permeability to water vapor.

It is a further object of the invention to provide a chlorine-free packaging film.

The above and other objects, benefits and advantages of the invention will be apparent from the disclosure below which is exemplary and nonlimiting. It is not necessary that each and every object listed above be found in all embodiments of the invention. It is sufficient that the invention may be usefully employed.

According to the present invention an article or a plurality of articles such as bars of soap are packaged in a multilayer, thermoplastic, biaxially stretched, flexible film having a thickness of 2 mil (50.8μ) or less, preferably 1 mil (25.44μ) or less. This inventive film has at least three and preferably at least five layers arranged in sequence and preferably in contact with one another. The essential three layers include two surface layers and a core layer disposed therebetween. Each of the surface layers comprises a blend of at least 45%, preferably at least 60%, by weight of a copolymer of ethylene and at least one $C_3$–$C_{10}$ α-olefin, preferably selected from the group consisting of: butene-1, methylpentene-1, hexene-1, octene-1 and mixtures thereof, the copolymer having an ethylene content of at least 70%, preferably at least 80 wt. %, a density of from 0.900 to less than 0.915 g/cm$^3$, and a melting point between 85 and 125° C., and from 5 to 15% by weight of high density polyethylene having a density greater than 0.940 g/cm$^3$.

The core layer comprises at least 45%, preferably at least 60%, most preferably at least 80% by weight of a copolymer of ethylene and at least one $C_3$–$C_{10}$ α-olefin, preferably selected from the group consisting of: butene-1, methylpentene-1, hexene-1, octene-1 and mixtures thereof, the copolymer having an ethylene content of at least 80 wt. % and a melting point between 85 and 125° C.

optionally and preferably there is at least one additional intermediate layer between the core layer and one (or preferably both) surface layers. The intermediate layers may comprise a blend of VLDPE and HDPE. In a preferred embodiment of the invention there are five layers in sequential contact (first, second, third, fourth, and fifth layers) with the first and fifth layers being surface layers disposed on opposing sides of a core third layer with intermediate second and fourth layers on opposing sides therebetween. The fourth layer may be the same or different from the second layer but is preferably comprised of a blend of resins as described above for the surface layers.

Optionally, any or all of the first through fifth layers may have from 0 to 20% by weight of LLDPE blended therein.

Preferably, the inventive film will be heat sealable having at least one layer which is crosslinked, preferably by irradiation. In a highly useful embodiment of the invention, the film will be heat shrinkable at temperatures such as 127° C. or lower, and may have shrinkage values in one or both of the MD and TD directions of at least about 60%.

In one embodiment of the invention, a process for making the above-described film is claimed. The film is useful to process and/or package articles, such as bars of soap, or foodstuffs.

DETAILED DESCRIPTION OF THE INVENTION

The present invention has utility in shrink packaging a wide variety of articles with a thin flexible film. For example, the inventive film may be used for packaging for shipment, or for sale, food products such as meat, or nonfood products such as video tapes.

Some of the benefits of the inventive film include: low coefficient of friction; good hot slip (ease of sliding against itself at elevated temperatures); high transparency; relatively low permeability to water vapor; high tear strength; high shrinkage values at 127° C. or lower; a moderate residual shrink force which forms and maintains a compact product without crushing; excellent heat sealability especially over a broad voltage range on commercial sealers; low levels of extractables with compliance with governmental regulations for food contact; low haze; high gloss; good tensile strength; a surface which is printable; good machinability; and an unexpectedly good combination of high tear strength, good optical properties, machinability and hot slip in a thin, heat sealable, biaxially stretch oriented film.

Advantageously, a preferred embodiment of the invention recycles polymers from the shrink film manufacturing process back into film e.g. in the intermediate layers of the preferred five layer embodiment. In an especially preferred embodiment, the inventive film has at least 60% (more preferably about 70% or higher) shrinkage values in at least one direction at 127° C. or less, and preferably at least 65% in both directions. Also, preferred films are heat sealable over a broad voltage range.

The present invention may be made in a variety of sizes as a heat shrinkable overwrap film capable of packaging or overwrapping articles of various sizes.

The invention in all of its embodiments comprises or utilizes a biaxially stretched, multilayer, thermoplastic polymeric flexible film of 2.0 mils (50.8 microns) or less having heat sealable outer layers, each comprising a blend of at least 45%, preferably at least 60%, by weight of a copolymer of ethylene and at least one $C_3$–$C_{10}$ α-olefin, preferably selected from the group consisting of: butene-1, methylpentene-1, hexene-1, octene-1 and mixtures thereof, the copolymer having an ethylene content of at least 60 wt. %, a density of from 0.900 to less than 0.915 g/cm$^3$, and a melting point between 85 and 125° C., and from 5 to 15% by weight of high density polyethylene having a density greater than 0.940 g/cm$^3$, and the multilayer film further comprising a core layer comprising at least 45%, preferably at least 80%, by weight of a copolymer of ethylene and at least one $C_3$–$C_{10}$ α-olefin, preferably selected from the group consisting of: butene-1, methylpentene-1, hexene-1, octene-1 and mixtures thereof, the copolymer having an ethylene content of at least 70, preferably at least 80, wt. % and a melting point between 85 and 125° C.

Optionally and preferably, intermediate layers between the core layer and either or both outer layers comprising a blend, preferably of at least 45%, more preferably at least 60% by weight, of a copolymer of ethylene and at least one $C_3$–$C_{10}$ α-olefin, preferably selected from the group consisting of: butene-1, methylpentene-1, hexene-1, octene-1 and mixtures thereof, the copolymer having an ethylene content of at least 70, preferably at least 80, wt. %, a density of from 0.900 to less than 0.915 g/cm$^3$, and a melting point between 85 and 125° C., and from 5 to 15% by weight of high density polyethylene having a density greater than 0.940 g/cm$^3$ may be provided e.g. to reclaim and utilize film trim and waste to improve operation efficiency by recycling and reprocessing film and polymer e.g. into one or more intermediate layers which may be coextruded with the essential layers of the film. The inventive films will preferably have a thickness of about 0.5–1.5 mil (12.7– 38.1 microns), although suitable films as thick as 2 mils (50.8 microns) or as thin as 0.4 mil (10 microns) may be made. Such films have good abuse resistance and machinability.

Advantageously, the films are heat shrinkable. Preferred films may also provide a beneficial combination of one or more or all of the disclosed properties including low haze, high gloss, high shrinkage values of at least 60% in both the machine direction and the transverse direction at 127° C. or less, good hot slip, high tear strength, good machinability, good mechanical strength and good barrier properties to water permeability.

Suitable ethylene α-olefin copolymer resins having a density of at least 0.900 g/cm$^3$ and less than 0.915 g/cm$^3$ for use in the essential outer and core layers have a ethylene content of at least 60 weight percent, and preferably at least 80 wt. %. Copolymerized with ethylene will be at least one $C_3$–$C_{10}$ α-olefin, such as propene, butene-1, pentene-1, hexene-1, methylpentene-1, octene-1, decene-1, and combinations thereof, preferably selected from the group consisting of butene-1, hexene-1, methylpentene-1, octene-1 and mixtures thereof. The invention contemplates use not only of bipolymers, but copolymers of multiple monomers such as terpolymers, e.g. ethylene-butene-1-hexene-1 terpolymer. Preferred are bipolymers of ethylene and octene-1 ($C_2$ $C_8$ copolymers). Preferred copolymers have a melting point between about 85° C. to 125° C., more preferably between about 120° C. to 125° C. The ethylene α-olefin copolymer resins used in the present invention may have various molecular weights, molecular weight distributions ($\overline{M}_w/\overline{M}_n$), and melt indices. Typically, the ethylene α-olefin copolymer resins used will have a $\overline{M}_w/\overline{M}_n$ of from 2 to 13, preferably greater than 5, and a melt index less than 4 dg/min., preferably less than 2 dg/min., most preferably between about 0.5 to 1.5 dg/min. as measured by ASTM D-1238, at 190° C. under a total load of 2.16 Kg (condition E).

A preferred ethylene α-olefin copolymer resin is commercially available from Nova Chemicals Ltd. of Calgary, Alberta, Canada under the trademark 10B. This resin is reportedly a copolymer of ethylene and octene-1 having a melting point of about 123° C., a density (ρ) of about 0.912 g/cm$^3$, and a melt index of about 1 dg/min.

Suitable high density polyethylenes(HDPEs) for use in the present invention include both homopolymers of ethylene as well as copolymers of a major portion by weight of ethylene with one or more α-olefins, preferably octene-1. hexene-1, or butene-1, most preferably octene-1. The HDPE homopolymer or copolymer will have a density greater than 0.940 g/cm$^3$, preferably between 0.945 and 0.955 g/cm$^3$, and a melting point between 125° C. and 140° C., preferably between about 125° C. and 135° C. Suitable HDPE polymers may have a melt index of at least 0.1 dg/minute, preferably from 0.2 to 4 dg/min., most preferably from 0.2 to 1 dg/min. A preferred HDPE resin is commercially available from Occidental Chemical Corporation, Alathon Polymers Division of Dallas, Tex., U.S.A. under the trademark Alathon L5045. This resin is reportedly a copolymer of ethylene and octene-1 having a melting point of about 131° C., a density (ρ) of about 0.950 g/cm$^3$, and a melt index of about 0.45 dg/min.

Suitable films of the present invention may have low haze e.g. less than 5%, preferably less than 3.5% haze, and high gloss e.g. a gloss greater than 80, preferably greater than 85 Hunter Units (H.U.) at 45°. Advantageously, some preferred embodiments of the present invention may have haze values of less than 3% and preferably less than 2.5%, and very high gloss values e.g. greater than 85 Hunter Units (H.U.) and preferably greater than 90 H.U.

In a preferred embodiment of the invention the article is a heat shrinkable multilayer film of at least five layers. These five layers are termed the first layer, the second layer, the third layer, the fourth layer, and the fifth layer. The first layer and fifth layer are outer surface layers disposed on opposing sides of the third (also called the core layer) layer and are preferably attached thereto by the second and fourth intermediate layers, respectively. The first, third and fifth layers are essential to the film of this invention.

When the film is formed into a package, these layers, one through five, comprise the wall of the package. This wall in cross-section has the first layer comprising an outer layer disposed closest to the package's interior surface with the fifth layer being an opposing outer layer typically disposed closest to the package's exterior surface. Advantageously, the inventive film may be constructed so that the outer layers are reversible, i.e. either surface may be used as the surface closest to the packaged goods or as the exterior abuse resistant layer.

It is contemplated according to the present invention that tubular films having more than five layers may be constructed. Such additional layers may preferably be disposed as additional intermediate layers lying between the third layer and either or both of the first and fifth layers, or these additional layers may comprise a surface layer and comprise either the interior or exterior surface of the tube.

Either the first or fifth layer may comprise the interior surface layer where in use it will contact an article encased by the film. Beneficially, this surface layer will be heat sealable to facilitate formation of sealed packages. Advantageously, the interior surface layer will, when used to package foodstuffs, be suitable for contact with foodstuffs containing protein, water and fat without evolving or imparting harmful materials, off tastes or odors to the foodstuff. Beneficially, either of the first and fifth layers may be the interior surface layer and either or both may consist essentially of VLDPE and HDPE with suitable slip and/or antiblock additives.

Also, either the first or the fifth layer may comprise the exterior surface of the package. As the exterior surface layer, this layer should be resistant to abrasions, abuse and stresses caused by handling and it should further be easy to machine (i.e. be easy to feed through and be manipulated by machines e.g. for conveying, packaging, printing or as part of the film or bag manufacturing process). It should also facilitate placement of a plurality of packages into another container or carton by having sufficient slip characteristics, particularly hot slip, to allow easy insertion of one package adjacent to another. It should also facilitate stretch orientation where a high shrinkage film is desired, particularly at temperatures such as 127° C. and lower.

Advantageously, the first layer will be predominantly comprised of ethylene copolymers having an ethylene content of 80 wt. % or more. Such layer may be an interior surface layer of the package.

Beneficially, in the present invention there are, optionally and preferably, intermediate layers on either side of the core layer(third layer). The second layer of this film is generally a reclaim layer which, in addition to providing economical recovery and use of polymer process waste and film trim, is also delamination resistant between the adjacent core layer and the opposing layer, and contributes to ease of orientation. Preferred embodiments of the inventive biaxially stretched film have high shrinkage values particularly at temperatures (127° C. or lower) in combination with slip and optical properties which are superior to many prior art films. The inventive film may be oriented to produce a biaxially stretched film having high shrinkage of 60% or higher at 127° C. or less.

In a preferred embodiment, the core layer directly adheres to the second and fourth layers which in turn are directly adhered respectively to both the interior (first) and exterior (fifth) layers. In a most preferred embodiment the film article consists essentially of five polymeric layers viz the interior (first) layer, the reclaim (second) layer, the core (third) layer, the reclaim (fourth) layer and the exterior (fifth) layer. This preferred embodiment provides a desirable combination of properties such as low moisture permeability, economic recycling of polymer, high gloss, low haze, good mechanical strength, chlorine-free construction, and desirable low shrink forces in a high shrink, heat shrinkable, multilayer packaging film which is heat sealable. Each of the film layers may optionally have processing aids or plasticizers.

For a three layer embodiment of the present invention, typical layer thicknesses for the essential layers of the inventive heat shrinkable film may be about 5–30% for a first outer (typically interior surface) layer, 40–80% core layer, and 5–30% opposing outer (typically exterior surface) layer, although films with differing layer ratio thicknesses are possible.

Typical layer thicknesses for the preferred five layers embodiment of the inventive heat shrinkable film may be about 5–30% first (typically interior surface) layer, 5–20% second (intermediate) layer, 30–80% third (core) layer, 5–20% fourth (intermediate) layer and 5–30% fifth (exterior) layer, although films with differing layer ratio thicknesses are possible. The first layer is typically an outer surface layer of the film and in a tubular manufacturing process is the interior surface layer of the tube. The functions of the first and fifth layers are to provide surface layers which have good cold and hot slip properties, and which are heat sealable to themselves or each other on commercially available equipment and for food packaging applications to provide a hygienic surface for contact with the foodstuff. In the present invention, to fulfill these functions the thickness of the first layer need not be great, but for an advantageous combination of ease of processing and seal performance this layer will preferably be from 0.03–0.6 mils thick.

Preferably, the outer layers allow the film to be sealed about the article or articles forming a sealed enclosure. By the term "heat sealing layer" is meant a layer which is heat sealable to itself, i.e., capable of fusion bonding by conventional heating means which generate sufficient heat on at least one film contact surface for conduction to the contiguous film contact surface and formation of a bond interface therebetween. The bond interface between contiguous sealed layers must have sufficient physical strength to withstand the tension resulting from stretching during packaging or shrinking during a shrinking operation and thereafter due to the presence of an article sealed within the film package.

Unless otherwise indicated in the present application, percentages of materials used in individual layers are based upon the weight of the indicated layer. The percentage of comonomer content of a particular polymer is based upon the weight of the indicated polymer.

The outer layers as the surface layers of a film especially a center folded film according to the present invention also provide good machinability and facilitate passage of the film over equipment and facilitate insertion of articles. These layers may be coated with an anti-block powder and may contain slip agents and/or other processing aides. Also, conventional antiblock additives, polymeric plasticizers, or slip agents may be added to the other layers of the film or they may be free from such added ingredients.

In one embodiment of the invention each outer layer comprises a blend of at least 5 wt. % HDPE and at least 45 wt. % of ethylene α-olefin copolymer (or blends thereof)

having a density of at least 0.900 g/cm³ and less than 0.915 g/cm³ with 0 to 0.5, preferably 0.3 to 0.5, most preferably 0.35 to 0.45 wt. % of a slip agent such as erucamide, oleamide or a wax and from 0 to 0.5 wt. % of an antiblock agent such as silica e.g. diatomaceous earth. The core layer comprises at least 45, preferably at least 60, most preferably at least 80 wt. % of ethylene α-olefin copolymer (or blends thereof) having a density of at least 0.900 g/cm³ and less than 0.915 g/cm³ with 0 to 0.5, preferably 0.3 to 0.5, most preferably 0.4 to 0.5 wt. % of a slip agent such as erucamide, oleamide or a wax.

The core layer provides good orientability and high shrink values. It also provides good optical properties when stretch oriented, including low haze and a stretching behavior compatible with the layers around it. It is desirable that the thickness of the core layer be between about 30 to 80% of the total multilayer film thickness to provide the desired combination of the performance properties sought e.g. with respect to shrinkage values, ease of orientation, and optical properties.

Optional second and fourth layers are disposed on either side of the core layer and provide good interlayer adhesion characteristics to the multilayer structure while permitting use of reclaimed polymer waste and trim from the film production process to be recycled into the film structure. Either or both of these layers may also contribute to the shrinkability and/or optical properties of the inventive film, and may also serve as a reservoir of slip agent which "blooms" to the surface to provide slip properties over time. The composition of each of the second and fourth layers comprises a blend of at least 45% of at least one copolymer of ethylene and at least one $C_3$–$C_{10}$ α-olefin, said copolymer having a density of from 0.900 to less than 0.915 g/cm³ and from 5 to 15 weight % of a high density polyethylene (HDPE). This first copolymer is often termed a very low density polyethylene.

The expression very low density polyethylene ("VLDPE") sometimes called ultra low density polyethylene ("ULDPE"), as used herein refers to substantially linear polyethylenes having densities below about 0.915 g/cm³ and having at least one melting point between 85° C. and 125° C., preferably at least 90° C. The density may possibly go as low as 0.86 g/cm³, but the present invention requires that these copolymers have a density of at least 0.900 g/cm³. This expression does not include ethylene alpha olefin copolymers of densities below about 0.90 g/cm³ with elastomeric properties and referred to as elastomers. Some elastomers are also referred to by at least one manufacturer as "ethylene alpha olefin plastomers", but other manufacturers have characterized VLDPE as an ethylene α-olefin with plastomeric properties. However, it is contemplated that ethylene alpha-olefin elastomers or plastomers may be advantageously used in the practice of this invention as a minor constituent in various layers of this multilayer film. VLDPE does not include linear low density polyethylenes (LLDPE) which have densities in the range of 0.915–0.930 gm/cm³, but it is contemplated that LLDPE may optionally be blended into one or more of the layers. VLDPE's as the term is used herein may be made by a variety of processes including solution or fluidized bed processes using a variety of catalysts including traditional Ziegler-Natta, single-site constrained geometry or metallocene catalysts.

VLDPE comprises copolymers (including terpolymers) of ethylene with alpha-olefins, usually 1-butene, 1-hexene or 1-octene, and in some instances terpolymers, as for example of ethylene, 1-butene and 1-hexene. A process for making VLDPEs is described in European Patent Document publication number 120,503 whose text and drawing are hereby incorporated by reference into the present document.

As for example described in Ferguson et al. U.S. Pat. No. 4,640,856 and Lustig et al. U.S. Pat. No. 4,863,769, VLDPEs are capable of use in biaxially oriented films and have superior properties to comparably made films having LLDPEs. These superior properties include higher shrink, higher tensile strength and greater puncture resistance.

Suitable VLDPEs include those manufactured by Nova Chemicals Ltd., Dow Chemical Company, Eastman Chemical Company, Exxon Chemical Company and Union Carbide Corporation.

The composition of each of the layers may also comprise from 0 to 20% of a copolymer of ethylene and at least one $C_3$–$C_{10}$ α-olefin having a density of at least 0.915 g/cm³ and a melting point less of at least 115° C., and/or a copolymer of ethylene with from 4 to 18% of a vinyl ester or alkyl acrylate, such as ethylene vinyl acetate copolymer (EVA), and/or low density polyethylene (LDPE).

The two outer layers of the inventive film may be identical or different from each other within the parameters of the above defined structure. Similarly, in the five layer embodiment, the composition of the second layer may be identical or different from that of the fourth layer within the parameters of the above defined 5-layer structure. For example the specific polymers used may differ from one layer to the other or they may be partially or completely the same or in the same or different amounts as long as they meet the specified characteristics. Also, the optional polymers and other ingredients not required by this invention may also be present in one or more layers, and the relative thicknesses of each layer may vary.

In the preferred 5-layer embodiment the ethylene α-olefin copolymer having a density of at least 0.900 g/cm³ and less than 0.915 g/cm³ of either or both of the second and fourth layers may comprise from 45% or more of each respective layer. The HDPE of either or both of the second and fourth layers may comprise from 5 to 15% of each respective layer.

The outer surface layer which is located distal from the articles packaged provides mechanical strength, shrinkability, abrasion resistance, heat sealability, good optical properties, and good slip properties, This outer is typically sufficiently thick so that in combination with the remaining layers of the film it provides good machinability, support, heat shrinkability, and imparts strength to the packaging film wall in order to withstand the shrinking operation, handling pressures, abrasion, and packaging. As an outer surface layer of the film, this layer provides a desirable glossy appearance.

Additives such as slip agents, anti-block agents and the like may also be incorporated into the fifth layer as well as into other layers. Such processing aids are typically used in amounts less than 10% and preferably less than 5% of the layer weight. A preferred processing aid for use in the outer layer of the film is a fluoroelastomer. The above ingredients are admixed together and extruded to provide a uniformly blended layer having good strength, processability, high shrinkage characteristics and good optical properties including high gloss.

Additives such as antiblock, slip and processing aids may be incorporated into any or all of the film layers including the three essential layers of the inventive film. Processing aids are generally supplied in a variety of carrier polymer resins from commercial sources such as Ampacet Corp. of Tarrytown, N.Y., U.S.A., or Techmer PM, LLC of Clinton, Tenn., U.S.A. Typically antiblock agents such as silica e.g.

in the form of diatomaceous earth available for example under the tradename Superfloss is added to the surface layers of the film to prevent the film from destructive or unwanted adherence to itself. However, antiblock may be found in other layers, particularly where reclaimed film is added to other layers. Antiblock is typically added in an amount from 0 to 0.5, preferably 0.1 to 0.4, weight % based upon the weight of the film layer. Slip agents such as waxes or fatty amides such as erucamide, stearamide, N,N ethylene-bis-stearamide, oleamide may be added to any or all of the film layers to impart slip characteristics to the film. A preferred slip agent is erucamide which is available under the tradename Kemamide E. These slip agents provide cold and hot slip properties to enable the film to move easily against itself. It has been found that the present invention's use of HDPE in the surface layers enhances slip properties especially after irradiative crosslinking. The combination of polymers used in the present invention and slip aid greatly enhance hot slip properties. Slip agents are typically added in an amount from 0 to 0.5, preferably 0.3 to 0.5, most preferably 0.35 to 0.45, weight % based upon the weight of the film layer. Advantageously such slip aids may be beneficially added to each of the layers of the present invention. Use of slip aids in amounts exceeding 0.5 wt. % may lead to undesirably build up on machine contact surfaces during packaging operations. Other processing aids such as fluoroelastomer processing aids may be used in the layers of the film. It should be understood that those skilled in the art can determine suitable levels and types of additives for the intended applications and film structures selected without undue experimentation.

Advantageously, the outer layer and/or intermediate layers may consist essentially of the first and second polymers with or without a minor amount (<15%) of additives including carrier resins.

The multilayer film of the invention may be made by conventional orientation processes including e.g. tentering, or tubular trapped or double-bubble processes, but preferably will be made by a double-bubble(trapped bubble) orientation process, especially under conditions to produce a film which is heat shrinkable in a range of 80° C. to 127° C.

The multilayer film, including the preferred five layer film of this invention may be manufactured by coextrusion of all layers simultaneously for example as described in U.S. Pat. No. 4,448,792 (Schirmer) or by a coating lamination procedure such as that described in U.S. Pat. No. 3,741,253 (Brax et al.) to form a relatively thick primary multilayer extrudate either as a flat sheet or, preferably, as a tube. This sheet or tube is oriented by stretching at orientation temperatures which are generally below the melting points for the predominant resin comprising each layer oriented. Stretch orientation may be accomplished by various known methods e.g. tentering which is commonly employed to orient sheets, or by the well-known trapped bubble or double bubble technique for orienting tubes as for example described in U.S. Pat. No. 3,456,044 (Pahlke). In this bubble technique an extruded primary tube leaving a tubular extrusion die is cooled, collapsed and then preferably oriented by reheating and inflating to form an expanded secondary bubble which is again cooled and collapsed. Preferred films are biaxially stretched. Transverse direction (TD) orientation is accomplished by the above noted inflation to radially expand the heated film which is cooled to set the film in an expanded form. Machine direction (MD) orientation is preferably accomplished with the use of sets of nip rolls rotating at different speeds to stretch or draw the film tube in the machine direction thereby causing machine direction elongation which is set by cooling. Orientation may be in either or both directions. Preferably, a primary tube is simultaneously biaxially stretched, radially (transversely) and longitudinally (machine direction), to produce a multilayer film which is heat shrinkable in both directions at temperatures below the melting points of the major polymeric components, e.g. at 90° C. or lower. Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films).

According to the present invention one or more of the essential film layers is oriented biaxially by stretching at temperatures low enough to produce strong, high shrink multilayer films having good optical properties and high tear strength.

In a preferred method for making the films of the present invention, a process for making a biaxially stretched, heat shrinkable, heat sealable, multilayer, flexible, thermoplastic film is used. This process includes a first step (a) of coextruding in a tubular form, around a volume of air, melt plastified polymeric resins forming a primary tube having at least three layers including: layers (a) and (c) both of which are blends of at least 45%, based on the layer weight, of (i) a copolymer of ethylene and at least one $C_3$–$C_{10}$ α-olefin, and at least 5%, based on the layer weight of (ii) a high density polyethylene; and layer (b) which has at least 45%, based on the layer weight, of (i) a copolymer of ethylene and at least one $C_3$–$C_{10}$ α-olefin. For each layer copolymer (i) has a density of at least about 0.900 g/cm³ and less than 0.915 g/cm³, and a melting point between 85° C. and 125° C. Layer (b) is disposed between layers (a) and (c), and layer (b) has 30–80% of the total thickness of the primary tube, the layers (a) and (c) each has at least 10% of the total thickness of the primary tube. Extrusion step (a) is followed by, (b) cooling and collapsing the primary tube; (c) reheating the primary tube to an orientation (draw) temperature; (d) simultaneously biaxially stretching the primary tube forming an expanded, biaxially stretched, secondary tube having a less than 2.0 mil (50.8µ) in thickness; and (e) rapidly cooling the stretched film thereby forming a heat shrinkable film having at least 60% shrink at 127° C. in at least one of the machine or transverse directions.

The above process may optionally have the heat shrinkable film be irradiated after the cooling step (e) of the stretched film. Also, the above process may use reclaimed film trim which is reprocessed into intermediate layers (d) and (e) which are coextruded in step (a) with layer (d) in contact with layers (a) and (b), and layer (e) in contact with layers (b) and (c).

In some embodiments of the invention films having excellent tear strengths of at least 12 Kg/cm in both the machine and transverse directions may be made. In a preferred embodiment of the invention the film has a tear strength of at least 15 Kg/cm in at least one direction.

Heat shrinkable multilayer films will have at least 10% shrink in at least one direction at 90° C., and will have at least 60% shrink at 127° C. in at least one direction (preferably both directions) and advantageously may have at least 65% shrink at 127° C. in both M.D. and T.D. directions, and beneficially may have at least 70% shrink in at least one direction at 127° C.

The stretch ratio during orientation should be sufficient to provide a film with a total thickness of between about 0.5 and 2.0 mils. The MD stretch ratio is typically 3½–5½ and the TD stretch ratio is also typically 3½–5½, but higher or lower ratios may be used depending upon equipment used and process parameters. An overall stretch ratio (MD stretch multiplied by TD stretch) of about 12¼–30 ¼ is suitable.

The preferred method for forming the multilayer film is coextrusion of the primary tube which is then biaxially oriented in a manner similar to that broadly described in the aforementioned U.S. Pat. No. 3,456,044 where the primary tube leaving the die is inflated by admission of a volume of air, cooled, collapsed, and then preferably oriented by reinflating to form a secondary tube termed a "bubble" with reheating to the film's orientation (draw) temperature range. Machine direction (MD) orientation is produced by pulling or drawing the film tube e.g. by utilizing a pair of rollers traveling at different speeds and transverse direction (TD) orientation is obtained by radial bubble expansion. The oriented film is set by rapid cooling. In the following examples, all five layers were coextruded as a primary tube which was cooled upon exiting the die by spraying with water. This primary tube was then reheated by radiant heaters to the draw temperature (also called the orientation temperature) for biaxial orientation. Cooling was accomplished by means of a concentric air ring.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), ionomers, polypropylenes, or blends thereof. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In some preferred embodiments of the invention it is preferred to crosslink at least one layer, preferably the entire film, to broaden the heat sealing range. This is preferably done by irradiation with an electron beam at dosage levels of at least about 2 megarads (MR) and preferably in the range of 2.5 to 5.0 MR, although higher dosages may be employed. Irradiation may be done on the primary tube or after biaxial orientation. The latter, called post-irradiation, is preferred and described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking enhancer added to one or more of the layers, as for example described in U.S. Pat. 4,055,328 (Evert et al.). The most commonly used crosslinking enhancers are organic peroxides such as trimethylpropane and trimethylacrylate.

The following are examples and comparative examples given to illustrate the present invention.

Experimental results and reported properties of the following examples are based on the following test methods or substantially similar test methods unless noted otherwise.

Coefficient of Friction (COF) Static and Kinetic: ASTM D1894-73 Procedure B

Tensile Strength: ASTM D-882, Method A

% Elongation at Break: ASTM D-882. Method A

Haze: ASTM D-1003-52

Gloss: ASTM D-2457, 45° angle (sample is taped without applying vacuum)

1% Secant Modulus: ASTM D-882, Method A

Oxygen Gas Transmission Rate ($O_2$GTR): ASTM D-3985-81

Water Vapor Transmission Rate (WVTR): ASTM F 1249-90

Elmendorf Tear Strength: ASTM D-1992

Gauge: ASTM D-2103

Melt Index: ASTM D-1238, Condition E (190° C.)

Melting point: ASTM D-3418, peak melting point determined by DSC with 5° C./minute heating rate.

Vicat Softening Point: ASTM D-1525-82

All ASTM test methods noted herein are incorporated by reference into this disclosure.

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C. " means a film having an unrestrained shrinkage value of at least 10% in at least one direction.

Shrink Force: The shrink force of a film is that force or stress required to prevent shrinkage of the film and was determined from film samples taken from each film. Four film samples were cut 1" (2.54 cm) wide by 7" (17.8 cm)

long in the machine direction and 1" (2.54 cm) wide by 7" (17.8 cm) long in the traverse direction. The average thickness of the film samples was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

Shrink Force (g/mil)=F/T wherein F is the force in grams and T is the average thickness of the film samples in mils.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. All percentages are by weight unless indicated otherwise.

EXAMPLES 1–6

In Examples 1–4, three biaxially stretched, heat shrinkable, multilayer films of the present invention were made. The layers of each multilayer film were coextruded and biaxially stretched according to a coextrusion type of tubular orientation process.

Examples 1–4 are five layered films. However, films of three to six or more layers are also contemplated by the present invention. The inventive multilayer films may include additional layers or polymers to add or modify various properties of the desired film such as heat sealability, interlayer adhesion, tear strength, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

For Examples 1–4, one extruder was used for each layer and the heat plastified resins from each extruder were introduced to a 5 layer plate coextrusion die from which the resins were coextruded at an first/second/third/fourth/fifth layer thickness ratio of about 15:10:50:10:15 for Examples 1–4.

In Examples 1–4, for each layer, the resin mixture was fed from a hopper into an attached single screw extruder where the resin mixture was heat plastified and extruded through a five layer coextrusion plate die into a primary tube. The extruder barrel temperatures for each layer was about 300–415° F. (149–213° C.). The extrusion die had an annular exit opening of 300 millimeters (mm) diameter with a 1.5 mm gap. The coextrusion die temperature profile was set from about 400° F. to 430° F. (204–221° C.). The extruded multilayer primary tube was cooled by immersion with water (about 10–38° C.) using a weir/calibrator system which is available from Polytype Italia S.p.A. of Marano Ticino, Italy.

The cooled primary tube was flattened by passage through a pair of nip rollers whose speed was controlled to neck down the primary tube to adjust the tube circumference or flatwidth. In Examples 1–4, a flattened tube of about 16 to 18¼ inches (41–46 cm) flatwidth was produced. The cooled flattened primary tube was reheated, biaxially stretched, and cooled.

The cooled tubular film was flattened, and the biaxially stretched and biaxially oriented film was wound on a reel. The machine direction (M.D.) draw or orientation ratio and the transverse direction (T.D.) bubble or orientation ratio was about 3.5:1 to 5.5:1 for all the films. The draw point or orientation temperature was below the predominant melting point for each layer oriented and above that layer's glass transition point. Draw point temperature, bubble heating and cooling rates and orientation ratios are generally adjusted to maximize bubble stability and throughput for the desired amount of stretching or orientation. The resultant films of Examples 1–4 having an average nominal gauge of 0.6 mils (15$\mu$) were biaxially oriented and had an excellent appearance.

Subsequent to reeling, about two weeks after orientation, the film was unreeled and irradiated at a level of about 3 Mrad by electron beam and according to methods well known in the art to cause crosslinking and then rewound.

For Examples 1–4, the polymers and additives used and the film structures are presented in Tables 1–3.

TABLE 1

| * | Commercial Designation | Copolymer Type | Density g/cm$^3$ | Melting Point ° C. | Melt index dg/min. |
|---|---|---|---|---|---|
| A | NOVA 10B | $C_2C_8$ | 0.912 | 123 | 1 |
| B | Alathon L5045 | $C_2C_8$ | 0.950 | 131 | 0.45 |
| C | Escorene 3201.63 | $C_2C_6$ | 0.925 | 126 | 0.8 |

*These letter designations are used to refer to these compositions in the following examples and the numbered tables. The commercial designation is believed to be the manufacturerts current commercial designation for similar polymer resins.

TABLE 2

| * | Additive Type (Weight %) | Carrier Resin (Weight %) | Carrier Density g/cm$^3$ | Carrier Melt Index dg/min. |
|---|---|---|---|---|
| D | erucamide (5%) | LDPE (95%) | 0.918 | 8 |
|   | diatomaceous earth (2%) | VLDPE (97.8%) | 0.908–0.914 | 6 |
| E | with antioxidant(0.2%) fluoroelastomer (3%) | LLDPE (95.75) | 0.917 | 2 |
| F | witholeamide (1.25%) | | | |
| G | erucamide (5%) | VLDPE (95%) | 0.908–0.914 | 6 |
| H | diatomaceous earth (5%) | LDPE (95%) | 0.920 | 2 |
| I | erucamide (5%) | LDPE (95%) | 0.920 | 2 |

*These letter designations are used to refer to these compositions in the following examples and the numbered tables. The commercial designation is believed to be the manufacturer's current commercial designation for similar polymer resins.

TABLE 3

| Ex. # | First Layer | Second Layer | Third Layer | Fourth Layer | Fifth Layer |
|---|---|---|---|---|---|
| 1 | 73% A:10% B:9% D: 7% E:1% F | 79% A:10% B:9% D: 2% F | 91% A:3% F:6% G | 79% A:10% B:9% D: 2% F | 73% A:10% B:9% D: 7% E:1% F |
| 2 | 49% A:10% B:24% C: 9% D:7% E:1% F | 59% A:10% B:20% C: 9% D:2% F | 91% A:3% F:6% G | 59% A:10% B:20% C: 9% D:2% F | 49% A:10% B:24% C: 9% D:7% E:1% F |
| 3 | 72.5% A:10% B:9% D:7.5% E:1% F | 79% A:10% B:9% D: 2% F | 91% A:3% F:6% I | 79% A:10% B:9% D: 2% F | 72.5% A:10% B:9% D: 7.5% E:1% F |
| 4 | 75% A:10% B:9% D: 1% F:5% H | 76% A:10.5% B:3.5% D:2.5% E:5.5% I | 87% A:3% F:10% I | 76% A:10.5% B:3.5% D:2.5% E:5.5% I | 75% A:10% B:9% D:1% F:5% H |

For all of the Examples 1–4, the first layer (which was the interior surface of the tubular film) comprised a blend of: (a) a copolymer of ethylene and octene-1, the copolymer having an ethylene content of at least 60 wt. %, having a melting point of about 123° C., a density (ρ) of about 0.912 g/cm$^3$, and a melt index of about 1 dg/min. and which is commercially available under the trademark 10B from Nova Chemicals Ltd. of Calgary, Alberta, Canada; and (b) a high density polyethylene which is a copolymer of ethylene and octene-1, having a melting point of about 131° C., and having a reported density of about 0.950 g/cm$^3$, a melt index of 0.45 dg/min., and which is commercially available under the trademark Alathon® L5045 from Occidental Chemical Corporation of Dallas, Tex., U.S.A. For Example 1, the first layer comprised a blend of 73 wt. % of Nova 10B, 10 wt. % Alathon 5045, 9 wt. % of a slip processing aid of 5 wt. % erucamide in an LDPE carrier resin (having an M.I. of 8 dg/min. and p of 0.918 g/cm$^3$) listed in Table 2 as additive "D", 7 wt. % of an antiblock processing aid comprising 2 wt. % diatomaceous earth and 0.2 wt. 5 antioxidant in a VLDPE carrier resin (having an M.I. of 6 dg/min. and ρ of 0.908–0.914 g/cm$^3$) listed in Table 2 as additive "EE", and 1 by weight of a slip processing aid comprising 3 wt. % fluoroelastomer and 1.25 wt. % of an oleamide in an LLDPE carrier resin (2 dg/min. M.I. and 0.917 g/cm$^3$ρ) which is listed in Table 2 as additive "F". For Example 2, the first layer composition was a blend of 49 wt. % Nova 10B, 10 wt. % Alathon L5045, 9 wt. % Additive D, 7 wt. % Additive E, 1 wt. % Additive F, and 24 wt. % of an LLDPE ethylene-hexene-1 copolymer (0.8 dg/min. M.I. and 0.925 g/cm$^3$ρ) sold under the trademark Escorene 3201.63 by Exxon Chemical Company of Houston, Tex. For Example 3, the first layer composition was a blend of 72.5 wt. % Nova 10B, 10 wt. % Alathon L5045, 9 wt. % Additive D, 7.5 wt. % Additive E, and 1 wt. % Additive F. For Example 4, the first layer composition was a blend of 75 wt. % Nova 10B, 10 wt. % Alathon L5045, 9 wt. % Additive D, 1 wt. % Additive F, and 5 wt. % of an antiblock processing aid comprising 5 wt. % diatomaceous earth in an LDPE carrier resin (having an M.I. of 2 dg/min. and p of 0.920 g/cm$^3$) listed in Table 2 as additive "H".

The fifth layer of Examples 1–4 (which was the exterior surface of the tube) was identical in composition to the first layer for each respective example.

In Examples 1, and 2, the third (core) layer compositions were identical and comprised 91% by weight of the above-described 10B ethylene-α-olefin copolymer which was blended with 6% by weight of a slip processing aid of 5 wt. % erucamide in a VLDPE carrier resin (having an M.I. of 6 dg/min. and ρ of 0.908–0.914 g/cm$^3$) listed in Table 2 as additive "G" and 3% by weight Additive F. The core layer composition of Example 3 was identical to that of Examples 1 and 2 except that the slip processing aid Additive G was replaced with 6 wt. % of a slip processing aid of 5 wt. % erucamide in a LDPE carrier resin (having an M.I. of 2 dg/min. and ρ of 0.920 g/cm$^3$) listed in Table 2 as additive "I". The core layer composition of Example 4 comprised a blend of 87 wt. % of 10B polymer, 10 wt. % Additive I, and 3 wt. % Additive F.

For both Examples 1 and 3, the second (intermediate) layer was a blend comprising 79 wt. % of Nova 10B polymer, 10 wt. % of Alathon 5045 polymer, 9 wt. % Additive D, and 2 wt. % Additive F. For Example 2, the second (intermediate) layer was a blend comprising 59 wt. % of Nova 10B polymer, 10 wt. % of Alathon 5045 polymer, 9 wt. % Additive D, 2 wt. % Additive F, and 20 wt. % Escorene 3201.63. For Example 4, the second (intermediate) layer was a blend comprising 76 wt. % of Nova 10B polymer, 10.5 wt. % of Alathon 5045 polymer, 3.5 wt. % Additive D, 5.5 wt. % Additive I, and 2.5 wt. % Additive E.

The fourth (intermediate) layer of Examples 1–4 was identical in composition to the second layer for each respective example.

Comparative Example 5 is not of the invention, but is a prior art example of a commercial film used for industrial shrink wrap packaging. The comparative film of Example 5 is believed to be a three to five layer film having an LLDPE and EVA blend structure. All of the examples including the comparative example are heat shrinkable at both 127° C. and 90° C. Example 5 has a nominal thickness of 0.6 mil (15μ).

Comparative Example 6 is not of the invention, but is a prior art example of a commercial film used for industrial shrink wrap packaging. The comparative film of Example 6 is believed to be an LLDPE based film. All of the examples including the comparative example are heat shrinkable at both 127° C. and 90° C. Example 6 has a nominal thickness of 0.6 mil (15μ).

Polymer and additives discussed in the Examples are listed above in Tables 1–2. Layer formulations of Examples 1–4 are reported in Table 3 above. Physical properties of the films of Examples 1–6 were measured and are reported in Tables 4–5 below.

TABLE 4

| Ex. No. | STRENGTH at RT ×10³ psi (Mpa) MD/TD | ELONGATION AT BREAK at RT % MD/TD | 1% SECANT MODULUS MPa MD/TD | SHRINK at 127° C. (at 90° C.) % MD/TD | SHRINK FORCE at 90° C. Kg/cm MD/TD | SHRINK FORCE at RT g/μ MD/TD | HAZE % | GLOSS at 45° Angle |
|---|---|---|---|---|---|---|---|---|
| 1 | 12.1/10.7 (83/74) | 82/92 | 193/190 | 71/71 (13/17) | 31/14 | 36/22 | 2.0 | 90 |
| 2 | 11.5/12.5 (79/86) | 94/189 | 179/170 | 73/68 (17/19) | 37/43 | 19/29 | 1.5 | 91 |
| 3 | 12.5/15.8 (86/109) | 79/172 | 276/320 | 74/68 (15/18) | 41/27 | 27/17 | 1.8 | 90 |
| 4 | 11.6/13.9 (80/96) | 88/180 | 270/336 | 73/68 (21/21) | 41/33 | 20/10 | 3.1 | 79 |
| 5 | 16.7/20.5 (115/141) | 104/156 | 342/318 | 80/81 (14/15) | 60/59 | 30/28 | 3.8 | 83 |
| 6 | 11.6/13.9 (80/96) | 139/131 | 292/302 | 70/71 | 44/52 | 18/22 | 2.6 | 83 |

RT — Room Temperature (~20–23° C.)

TABLE 5

| Ex. No. | TEAR STRENGTH Kg/cm MD/TD | COF† STATIC IN/IN | COF† STATIC OUT/OUT | COF† KINETIC IN/IN | COF† KINETIC OUT/OUT | 24 Hour O₂ Transmission cm³/m² of film at 1 atmosphere (μ)* | 24 Hour MVT g/m² of film at 100° F. (37.8° C.) & 1 atmosphere (μ)* |
|---|---|---|---|---|---|---|---|
| 1 | 12/13 | 0.34 | 0.32 | 0.27 | 0.38 | ND | ND |
| 2 | 17/10 | >2.00 | >2.00 | >2.00 | >2.00 | ND | ND |
| 3 | 17/15 | >2.00 | 0.27 | >2.00 | 0.18 | 9520 (18) | 3120 (15) |
| 4 | 17/12 | 0.18 | 0.16 | 0.14 | 0.13 | ND | ND |
| 5 | 12/9.4 | 0.27 | 0.19 | 0.20 | 0.16 | ND | ND |
| 6 | 13/11 | 0.28 | 0.23 | 0.35 | 0.16 | ND | ND |

*Measurement is for film having the indicated thickness reported in micrometers (μ).
RT = Room Temperature (~20–23° C.)
ND = Not Determined
†Average of four COF measurements, except for the film of Example 4 which are averages of 36 measurements.

The results in Tables 4 and 5 demonstrate that films according to the present invention have good physical properties. The elongation at break, tensile strength, unrestrained shrink, and shrink force properties of Examples 1–4 of the invention are sufficient for intended applications or comparable to commercially available films for packaging a variety of goods as exemplified by comparative Examples 5 and 6. For packaging articles, the reported elongation at break values for the example films of the invention have very good extensibility which is adequate to accommodate any stretching encountered under typical packaging and process conditions.

Although comparative Example 5 has slightly better unrestrained shrink values than the films of the Examples 1–4, all of the inventive films have adequate and excellent unrestrained shrink values. The present invention is capable of producing films with even higher shrinkage values in both directions at the test temperatures. Therefore the inventive films may have desirably high shrinkage values which may be greater than 70% in either or both directions at 127° C.

Also the shrink forces reported for Examples 1–4, especially the residual shrink forces, are at levels desirable to hold the film in close contact with the enclosed article not only during possible processing subsequent to packaging, but also at room temperature. The residual shrink force at room temperature is important e.g. when a package may be opened exposing one end to the deleterious effects of exposure to the environment. Disadvantageously, the film of comparative example 5 has a shrink force that is too high for some applications for which the packaged goods may be crushed by the film shrink force at elevated or at residual room temperatures. Films having a moderate residual shrink force such as those values reported for Example 1–4 of the invention have continued close contact between film and article even after perforation without being so high as to crush the packaged goods. The measured values of Examples 1–4 indicate that the film would be kept in close contact with an enclosed article and continue to maintain its protective functions. Various embodiments of the inventive films may provide shrink forces of between 10 and 45 Kg/cm in both M.D. and T.D. directions.

The optical properties of Examples 1–3 show that the inventive films have superior low haze and high gloss relative to the comparative examples 5 and 6 which were much hazier and less glossy than the inventive examples.

The inventive films of Examples 1–4 demonstrate lower modulus values indicating a softer film (which is desirable for certain applications) yet having comparable or superior tear strength to the tested commercially available comparative film samples. The inventive films have excellent tear strengths. Preferred embodiments of the invention may have tear strengths of at least 12 Kg/cm in both the machine and transverse directions as shown by the films of Examples 1, 3, and 4. In an especially preferred embodiment of the invention, the film has a tear strength of at least 15 and preferably at least about 17 Kg/cm in at least one direction as demonstrated by films of examples 2–4. Advantageously these high tear strengths enable films of the invention to be used efficiently in high speed packaging operations where it is detrimental to productivity to have trimmed film break during the trimming operation in which film is continuously trimmed and wound onto a reel as seals are made. The present invention has tear strengths which are greatly superior to comparative films of examples 5 and 6.

The oxygen barrier properties of the inventive film are excellent for applications requiring high permeability to oxygen. The oxygen transmission rate was measured under ambient conditions for 24 hours for the inventive film of Example 3 which had excellent oxygen transmission. Various embodiments of the present invention may have an oxygen transmission rate greater than 1000, and preferably greater than 8000, $cm^3/m^2$ at 1 atmosphere for a 24 hour period at ambient temperature and humidity.

The impulse seal range for all the irradiatively crosslinked Examples 1–4 was sufficiently broad for use and sealing by commercially available sealing equipment including hot bar or impulse sealers. None of the tested films of examples 1–4 delaminated during use. None of the films of examples 1–4 exhibited seal failure.

The film of Example 1 was tested on a commercial packaging production line for packaging bars of soap. The film machined well and produced packages having an excellent appearance with excellent optical properties, and good toughness and tensile strength. The inventive film sealed well producing strong seals on the commercial line sealer and the film shrinkage properties were good.

The coefficient of friction was measured for the films of Examples 1–6. Example 1 had adequately low COF for machinability and Example 3 had good outer surface COF. The hot slip characteristics of example 1 was also suitable, but both COF and hot slip were greatly improved in the embodiment of Example 4. Hot slip properties for the inventive films are enhanced by the presence of HDPE in combination with the ethylene a-copolymer as specified above. The COF and hot slip of the inventive films are capable of exceeding the hot slip properties of the comparative films 5 and 6. The COF of Example 4 is greatly superior to that for the comparative examples 5 and 6.

Films, and packages of the present invention may also employ combinations of characteristics as described in one or more of the claims including dependent claims which follow this specification and where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

What is claimed is:

1. A multilayer, biaxially stretched, flexible, thermoplastic film comprising:

at least three layers (a), (b), and (c) with layer (b) disposed between layers (a) and (c), wherein layer (a) comprises a blend of: at least 45%, based on the weight of said layer (a), of (i) a copolymer of ethylene and at least one $C_3$–$C_{10}$ α-olefin, said copolymer having a density of at least about 0.900 $g/cm^3$ and less than 0.915 $g/cm^3$, a melting point between 85° C. and 125° C., and having at least 80 wt. % of its polymeric units derived from ethylene; and at least 5%, based on the weight of said layer (a), of (ii) a high density polyethylene;

layer (b) comprises at least 45%, based on the weight of said layer (b), of (i) a copolymer of ethylene and at least one $C_3$–$C_{10}$ α-olefin, said copolymer having a density of at least about 0.900 $g/cm^3$ and less than 0.915 $g/cm^3$, a melting point between 85° C. and 125° C., and having at least 80 wt. % of its polymeric units derived from ethylene; and layer (c) comprises a blend of: at least 45%, based on the weight of said layer (c), of (i) a copolymer of ethylene and at least one $C_3$–$C_{10}$ α-olefin, said copolymer having a density of at least about 0.900 $g/cm^3$ and less than 0.915 $g/cm^3$, a melting point between 85° C. and 125° C., and having at least 80 wt. % of its polymeric units derived from ethylene; and at least 5%, based on the weight of said layer (c), of (ii) a high density polyethylene;

wherein said film has a total film thickness of 50.8 micrometers ($\mu$) or less, and a shrinkage value of at least 60% in at least one of the machine and transverse directions at 127° C.

2. A film, as defined in claim 1, wherein each said copolymer (i) of layers (a), (b), and (c) is present in said respective layer in an amount of at least 60% based on the weight of said layer.

3. A film, as defined in claim 1, wherein said high density polyethylene is present in each respective blend of said layers (a) and (c) in an amount between about 5 to 15% based on the weight of said respective blend.

4. A film, as defined in claim 1, wherein said copolymer (i) of said layer (a) comprises a copolymer of ethylene and octene-1.

5. A film, as defined in claim 1, wherein said copolymer (i) of said layer (b) comprises a copolymer of ethylene and octene-1.

6. A film, as defined in claim 1, wherein said copolymer (i) of said layer (c) comprises a copolymer of ethylene and octene-1.

7. A film, as defined in claim 1, wherein said copolymer (i) of said layer (a) comprises a copolymer of ethylene and hexene-1.

8. A film, as defined in claim 1, wherein said copolymer (i) of said layer (b) comprises a copolymer of ethylene and hexene-1.

9. A film, as defined in claim 1, wherein said copolymer (i) of said layer (c) comprises a copolymer of ethylene and hexene-1.

10. A film, as defined in claim 1, wherein said copolymer (i) of at least one of said layers (a), (b), and (c) comprises a copolymer of ethylene, butene-1 and hexene-1.

11. A film, as defined in claim 1, wherein said high density polyethylene of said layer (a) comprises a copolymer of ethylene and octene-1.

12. A film, as defined in claim 1, wherein said high density polyethylene of said layer (a) comprises a copolymer of ethylene and hexene-1.

13. A film, as defined in claim 1, wherein said high density polyethylene of said layer (a) comprises a copolymer of ethylene and butene-1.

14. A film, as defined in claim 1, wherein said high density polyethylene of said layer (c) comprises a copolymer of ethylene and octene-1.

15. A film, as defined in claim 1, wherein said high density polyethylene of said layer (c) comprises a copolymer of ethylene and hexene-1.

16. A film, as defined in claim 1, wherein said high density polyethylene of said layer (c) comprises a copolymer of ethylene and butene-1.

17. A film, as defined in claim 1, wherein each of said high density polyethylenes of respective layers (a) and (c) has a melting point of between 125° C. and 135° C.

18. A film, as defined in claim 1, wherein each of said high density polyethylenes of respective layers (a) and (c) has a density between about 0.945 and 0.955 g/cm$^3$.

19. A film, as defined in claim 1, wherein said high density polyethylene of said layers (a) and (c) each has a melt index between about 0.2 and 4 dg/minute.

20. A film, as defined in claim 1, wherein said copolymers (i) of said layers (a), (b), and (c) each has a melt index between about 0.25 and 5 dg/minute.

21. A film, as defined in claim 1, wherein said layers (a) and (c) of said film each comprises a thickness of 5 to 30% of said multilayer film thickness.

22. A film, as defined in claim 1, wherein said layer (b) of said film comprises a thickness of 30 to 80% of said multilayer film thickness.

23. A film, as defined in claim 1, wherein said layers (a), (b) and (c) of said film each further comprises a slip agent in an amount up to 0.5 wt. % selected from the group consisting of waxes, oleamide and erucamide.

24. A film, as defined in claim 1, wherein said layers (a), (b), and (c) of said film each further comprises erucamide in an amount between 0.3 and 0.5 wt. % based upon the weight of each respective layer.

25. A film, as defined in claim 1, wherein said film has a tear strength of at least 15 Kg/cm in at least one of the machine direction (M.D.) and transverse direction (T.D.).

26. A film, as defined in claim 1, wherein said film has a shrink force at 90° C. of between 10 and 45 Kg/cm in both the machine direction (M.D.) and transverse direction (T.D.).

27. A film, as defined in claim 1, wherein at least one of said layers (a), (b), and (c) further comprises ionomer, an ethylene vinyl ester, a linear low density polyethylene, a low density polyethylene, an elastomer, a plastomer, or blends of one or more thereof.

28. A film, as defined in claim 1, wherein said film has an oxygen transmission rate of greater than 1000 cm$^3$/m$^2$ at 24 hours at 1 atmosphere, and at about 73° F. (~23° C.).

29. A film, as defined in claim 1, wherein said film is irradiated between about 2.5 to 5 Mrad.

30. A film, as defined in claim 1, wherein said film layers (a), (b), and (c) are crosslinked.

31. A film, as defined in claim 1, wherein said film has a haze value of less than 3.5%.

32. A film, as defined in claim 1, wherein said film has a gloss at 45° which is 85 Hunter Units or greater.

33. A film, as defined in claim 1, further comprising intermediate thermoplastic layers (d) and (e), said layer (d) being between and in contact with layers (a) and (b), and said layer (e) being between and in contact with said layers (b) and (c); wherein each of said layers (d) and (e) comprises:

a blend of: at least 45%, based on the weight of said layer, of (i) a copolymer of ethylene and at least one $C_3$–$C_{10}$ α-olefin, said copolymer having a density of at least about 0.900 g/cm$^3$ and less than 0.915 g/cm$^3$, and a melting point between 85° C. and 125° C.; and at least 5%, based on the weight of said layer, of (ii) a high density polyethylene.

34. A process for making a biaxially stretched, heat shrinkable, heat sealable, multilayer, flexible, thermoplastic film comprising:

(a) coextruding in a tubular form, around a volume of air, melt plastified polymeric resins forming a primary tube having at least three layers including:

layer (a) comprising a blend of: at least 45%, based on the weight of said layer (a), of (i) a copolymer of ethylene and at least one $C_3$–$C_{10}$ α-olefin, said copolymer having a density of at least about 0.900 g/cm$^3$ and less than 0.915 g/cm$^3$, a melting point between 85° C. and 125° C., and having at least 80 wt. % of its polymeric units derived from ethylene; and at least 5%, based on the weight of said layer (a), of (ii) a high density polyethylene;

layer (b) comprising at least 45%, based on the weight of said layer (b), of (i) a copolymer of ethylene and at least one $C_3$–$C_{10}$ α-olefin, said copolymer having a density of at least about 0.900 g/cm$^3$ and less than 0.915 g/cm$^3$, a melting point between 85° C. and 125° C., and having at least 80 wt. % of its polymeric units derived from ethylene; and layer (c) comprising a blend of: at least 45%, based on the weight of said layer (c), of (i) a copolymer of ethylene and at least one $C_3$–$C_{10}$ α-olefin, said copolymer having a density of at least about 0.900 g/cm$^3$ and less than 0.915 g/cm$^3$, a melting point between 85° C. and 125° C. and having at least 80 wt. % of its polymeric units derived from ethylene; and at least 5%, based on the weight of said layer (c), of (ii) a high density polyethylene;

wherein layer (b) is disposed between layers (a) and (c), and said layer (b)comprises 30–80% of the total thickness of the primary tube, said layers (a) and (c) each comprising at least 10% of the total thickness of the primary tube;

(b) cooling and collapsing said primary tube;

(c) reheating said primary tube to an orientation (draw) temperature;

(d) simultaneously biaxially stretching said primary tube forming an expanded, biaxially stretched, secondary tube having a less than 2.0 mil (50.8μ) in thickness; and (e) rapidly cooling said stretched film thereby forming a heat shrinkable film having at least 60% shrink at 127° C. in at least one of the machine or transverse directions.

35. A process, as defined in claim 34, wherein said heat shrinkable film is irradiated after said cooling step (e) of said stretched film.

36. A process, as defined in claim 34, wherein reclaimed film trim is reprocessed into intermediate layers (d) and (e) which are coextruded in step (a) with layer (d) in contact with layers (a) and (b), and layer (e) in contact with layers (b) and (c).

* * * * *